United States Patent
Killian

(10) Patent No.: US 10,118,261 B2
(45) Date of Patent: Nov. 6, 2018

(54) METHOD FOR MANUFACTURING A GEAR

(71) Applicant: Eaton Capital, Dublin (IE)

(72) Inventor: Michael Killian, Troy, MI (US)

(73) Assignee: Eaton Capital, Dublin (IE)

( * ) Notice: Subject to any disclaimer, the term of this patent is extended or adjusted under 35 U.S.C. 154(b) by 543 days.

(21) Appl. No.: 14/644,490

(22) Filed: Mar. 11, 2015

(65) Prior Publication Data
US 2015/0258642 A1 Sep. 17, 2015

Related U.S. Application Data

(60) Provisional application No. 61/951,014, filed on Mar. 11, 2014.

(51) Int. Cl.
| | |
|---|---|
| *B23K 20/12* | (2006.01) |
| *B23P 15/14* | (2006.01) |
| *B21K 1/30* | (2006.01) |
| *B21K 25/00* | (2006.01) |
| *F16H 55/12* | (2006.01) |
| *F16H 55/17* | (2006.01) |
| *B23K 101/00* | (2006.01) |

(52) U.S. Cl.
CPC ............ *B23P 15/14* (2013.01); *B21K 1/30* (2013.01); *B21K 25/005* (2013.01); *B23K 20/12* (2013.01); *B23K 20/127* (2013.01); *B23K 20/129* (2013.01); *F16H 55/12* (2013.01); *B23K 2201/008* (2013.01); *F16H 55/17* (2013.01); *Y10T 29/49467* (2015.01); *Y10T 29/49474* (2015.01)

(58) Field of Classification Search
CPC .......... B23P 15/14; F16H 55/12; F16H 55/17; B23K 20/129; B23K 20/12; B23K 20/127; B23K 2201/008; B21K 25/005; B21K 1/30; Y10T 29/49474; Y10T 29/49467

See application file for complete search history.

(56) References Cited

U.S. PATENT DOCUMENTS 3,798,011 A * 3/1974 Sharp, Jr. ............... B23K 20/08
138/143

FOREIGN PATENT DOCUMENTS

| JP | 2001116112 A | * | 4/2001 |
|---|---|---|---|
| JP | 2004138209 A | * | 5/2004 |

OTHER PUBLICATIONS

Merchant, H. D., et al., "Hardness-temperature relationships in metals", Journal of Materials Science 8 (1973), pp. 437-442.

* cited by examiner

Primary Examiner — Sarang Afzali
Assistant Examiner — Ruth G Hidalgo-Hernandez
(74) Attorney, Agent, or Firm — Dierker & Kavanaugh, P.C.

(57) ABSTRACT

A method for manufacturing a gear includes providing a rim gear, a hub and a core wherein the core is annular and has a core forging temperature below a hot hardness temperature of the rim gear and the hub. The rim gear and the hub are rotated about an axis relative to the core. During the relative rotation, the rim gear and the hub are in contact with the core to generate friction heat to raise an interface temperature of the core to the core forging temperature. The hub is driven into the core to upset a first portion of the core into an outer annular groove defined in a first faying surface of the hub. The rim gear is driven over the core to upset a second portion of the core into an inner annular groove defined in a second faying surface of the rim gear.

15 Claims, 6 Drawing Sheets

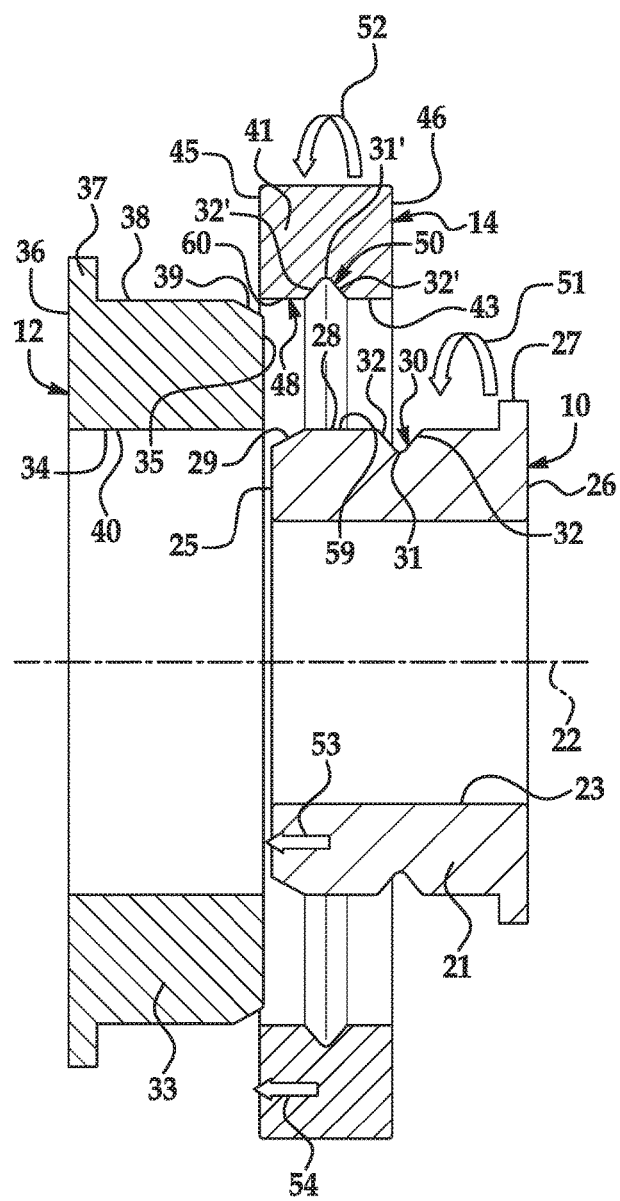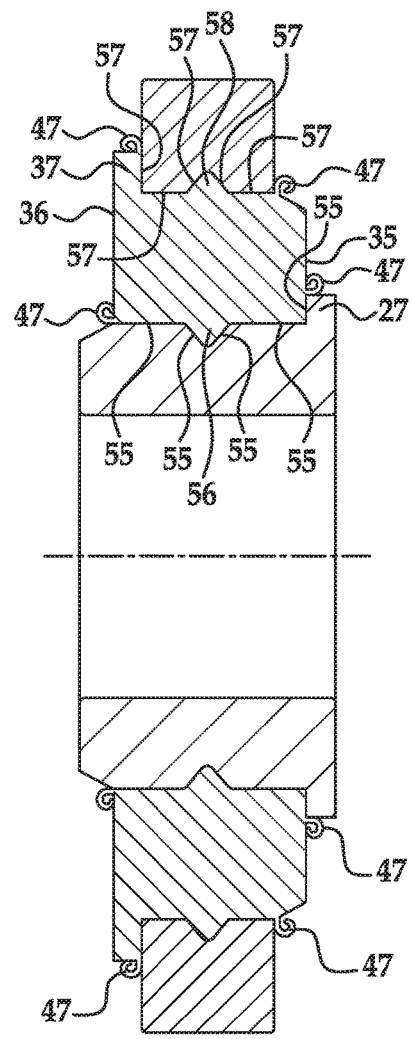
FIG. 3A
FIG. 3B

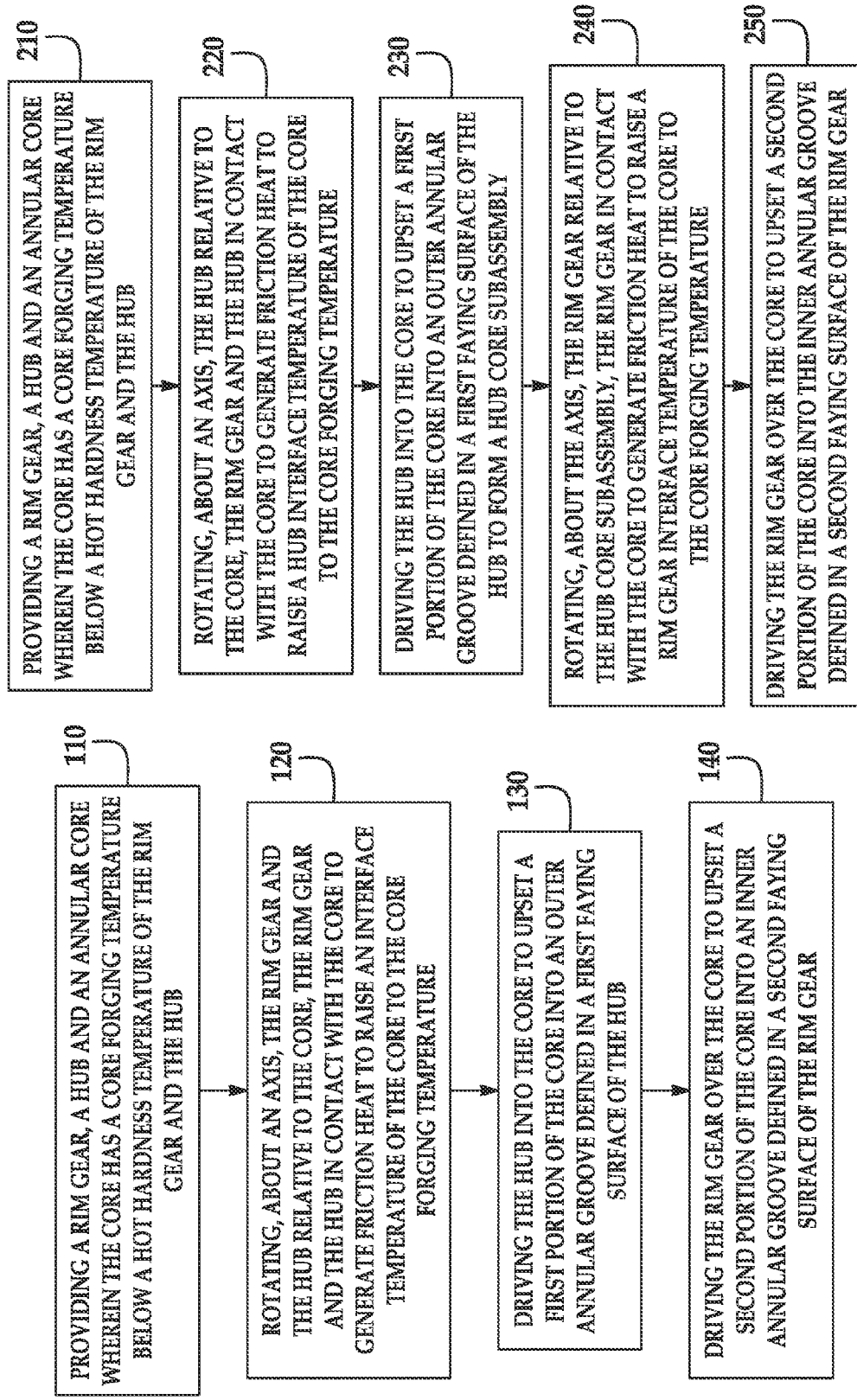

METHOD FOR MANUFACTURING A GEAR

CROSS-REFERENCE TO RELATED APPLICATIONS

This application claims the benefit of U.S. Provisional Application Ser. No. 61/951,014, filed Mar. 11, 2014, the contents of which are incorporated herein by reference.

BACKGROUND

Transmissions for Class 6 through 8 commercial line haul and off road trucks are rugged and reliable. Some such transmissions provide more than one million miles of service; however the transmissions can be heavy. Some heavy duty (HD) truck transmissions weigh from about 500 to about 800 pounds. Thirty percent of the weight of typical existing HD transmission is attributed to the gears. Some currently made gears are fabricated from one piece of solid, carburized steel (e.g., AISI 8620). First, a solid steel billet is forged into a steel pancake. Second, the gear teeth are machined into the pancake. More than 10 percent of the steel is machined away from the pancake and ultimately discarded or recycled. The machined gear is carburized for as long as 13 hours in a furnace that runs continuously. The carburized gear is hardened and tempered in another furnace. Gears fabricated in this existing manner can weigh from several pounds to about 32 pounds depending on the pitch diameter and axial length. Heavy gears can be a factor that limits fuel economy in large commercial trucks. Gear weight in a transmission can also limit the performance of military and commercial helicopters.

The production of gears fabricated in the traditional manner described above may contribute to the consumption of energy by carburizing and heat treating/tempering furnaces that operate continuously. Some heat treating/tempering furnaces may emit carbon dioxide into the environment.

SUMMARY

A method for manufacturing a gear includes providing a rim gear, a hub and a core wherein the core is annular and has a core forging temperature below a hot hardness temperature of the rim gear and the hub. The rim gear and the hub are rotated about an axis relative to the core. During the relative rotation, the rim gear and the hub are in contact with the core to generate friction heat to raise an interface temperature of the core to the core forging temperature. The hub is driven into the core to upset a first portion of the core into an outer annular groove defined in a first faying surface of the hub. The rim gear is driven over the core to upset a second portion of the core into an inner annular groove defined in a second faying surface of the rim gear.

BRIEF DESCRIPTION OF THE DRAWINGS

Features and advantages of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 3A depicts a semi-schematic cross-sectional view of an example of a rotating rim gear and hub aligned with a core prior to friction plunge welding according to the present disclosure;

FIG. 3B depicts a semi-schematic cross-sectional view of the example depicted in FIG. 3A after being formed into a gear by friction plunge welding according to the present disclosure;

FIG. 6 is a flowchart depicting an example of the method of the present disclosure; and FIG. 7 is a flowchart depicting another example of the method of the present disclosure.

DETAILED DESCRIPTION

Figure 1A:
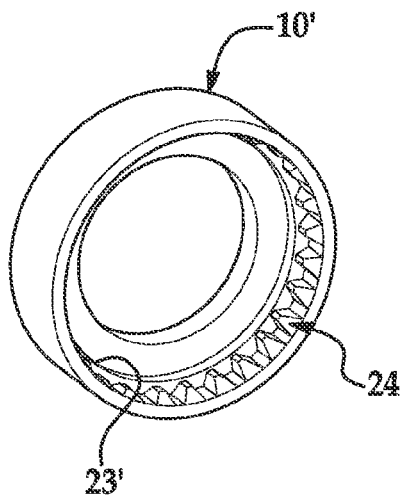
FIG. 1A is a semi-schematic perspective view of an example of a hub according to the present disclosure.

As disclosed herein, Friction Plunge Welding (FPLW) is a solid state welding process to join dissimilar materials. FPLW combines solid state welding with mechanical interlocking. FPLW is accomplished with the base materials remaining in a solid state with little or no melting. As disclosed herein, the dissimilar materials may include a base metal couple with one base metal having a significantly higher hot hardness, higher melting temperature and higher forging temperature than the other base metal. As used herein, hot hardness means a property of a material to retain a hardness at an elevated temperature. The hardness of a metal varies with temperature. As stated by Merchant et al, the hardness-temperature relationship is given as H= A EXP (−BT) where H is a hardness equivalent to the mean compressive stress and T is temperature in Kelvin. A is an extrapolated "intrinsic hardness" i.e. hardness at T=0 and constant B is the softening coefficient of hardness. The constants A and B have one set of values ($A_1$, $B_1$) at low temperatures and another set ($A_2$, $B_2$) at higher temperatures, suggesting a change of mechanism. The transition between the low- and high-temperature behaviors may occur at one temperature or over a range of temperatures. In most metals and alloys, the transition temperature ($T_t$) is about half the melting temperature ($T_m$). (Hardness- temperature relationships in metals, Merchant et al, Journal of Materials Science 8, 1973, 437-442.)

As used herein, "hot hardness temperature" means the transition temperature $T_t$ as defined by Merchant et al. AISI (American Iron and Steel Institute) H13 is an example of a steel that maintains its hardness up to temperatures beyond 900° C. (degrees Celsius). However, conventional carburizing gear steels like SAE 8620 start to temper back in hardness at temperatures of 177° C. AISI H13 can be used as forging die base material to forge 8620 steel. Aluminum has no hot hardness. It is soft at all temperatures. All steels have higher hot hardness than aluminum. In FPLW, the frictional heating from steel in rotational contact with aluminum immediately elevates the interface temperature. The aluminum softens, becoming pliable and easily displaceable by the steel. In examples of FPLW disclosed herein, steel pushes the heated soft aluminum away. As disclosed herein, a groove is disposed along the path of aluminum movement, and the aluminum fills the groove.

An example of a base metal couple for FPLW is a steel alloy to be joined to an aluminum alloy. Steel alloy AISI 4150 has a hot hardness to about 800° C., a melting temperature over 1400° C. and a forging temperature over 900° C. In contrast, aluminum alloy 6061 has very low hardness at any temperature, a melting temperature of 600° C. (800° C. lower than steel) and a forging temperature of 450° C. (450° C. lower than steel).

After a short duration frictional heating of the 4150 steel/6061 aluminum interface, the steel is able to bore easily into the aluminum. The aluminum near the interface is displaced to form "ram's horns" of upset aluminum metal or to fill a designed cavity. The FPLW disclosed herein differs from Friction Welding (FW). For example, FW relies only on the development of a solid state weld bond between two materials; however, FPLW relies on both the development of (a) a solid state weld bond and (b) a mechanical interlock. Breaking a friction weld, although a difficult task, requires breaking only the solid state weld. To break a friction plunge weld, the solid state weld bond must be broken first and then, in addition, the mechanical interlock must be broken. Thus, FPLW provides redundant joining modes.

Another example of a difference between FW and the FPLW of the present disclosure is in the weld angles. FW creates welds generally perpendicular to the longitudinal plane of the work pieces; however, FPLW produces welds that occur at several angles in addition to perpendicular to the longitudinal axis of the work pieces. The multiple angle weld bonds are associated with creating the mechanical interlock.

Yet another example of a difference between FW and the FPLW of the present disclosure is in the diversion of displaced metal to mechanically interlocking structures. With FW, the material upset during the welding process is displaced to the outside of the weld joint interface. This FW "ram's horn" material can be removed by a subsequent machining operation and discarded as scrap metal. As disclosed herein, with FPLW, a portion of the metal displaced during the welding process is forced into a cavity to be filled by the back or reversed upsetting of metal. The upset metal is driven into the cavity to become a mechanical interlock. The mechanical interlock reinforces the solid state weld.

Figure 1B:
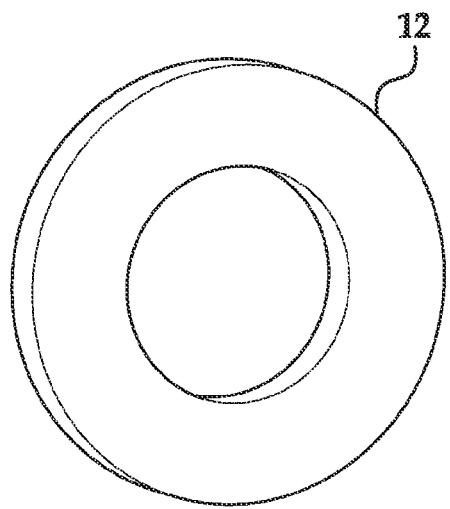
FIG. 1B is a semi-schematic perspective view of an example of a core according to the present disclosure.
Figure 1C:
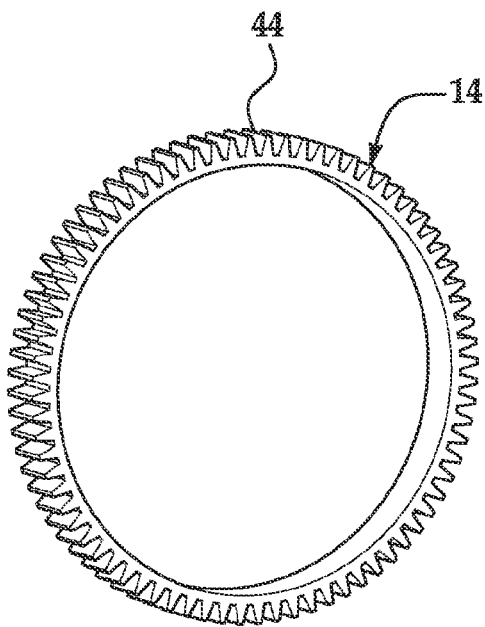
FIG. 1C is a semi-schematic perspective view of an example of a rim gear according to the present disclosure.

As disclosed herein, FPLW forms a lightweight gear from dissimilar metals. Examples of the method of the present disclosure form gears by using FPLW to join three elements. As depicted in FIGS. 1A-1C, a hub 10' and a rim gear 14 may be formed from steel. A core 12 may be formed from aluminum or an aluminum alloy. The hub 10', core 12, and rim gear 14 may be combined to form a gear 20 having an interlocking cross section as depicted in FIG. 2A.

Figure 2A:
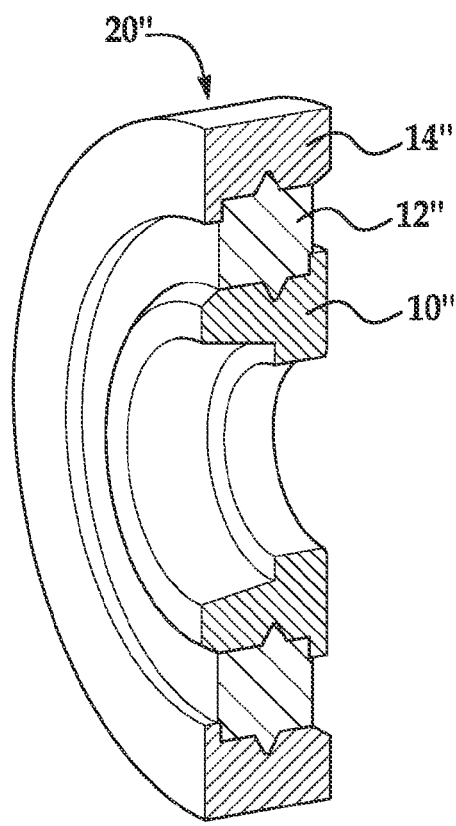
FIG. 2A is a semi-schematic cross-sectional perspective view of an example of a gear according to the present disclosure.

FIG. 2A depicts a semi-schematic cross-sectional perspective view of an example of a gear 20" according to the present disclosure. The example is described in detail below in the detailed description of FIGS. 5A-5D.

Figure 2B:
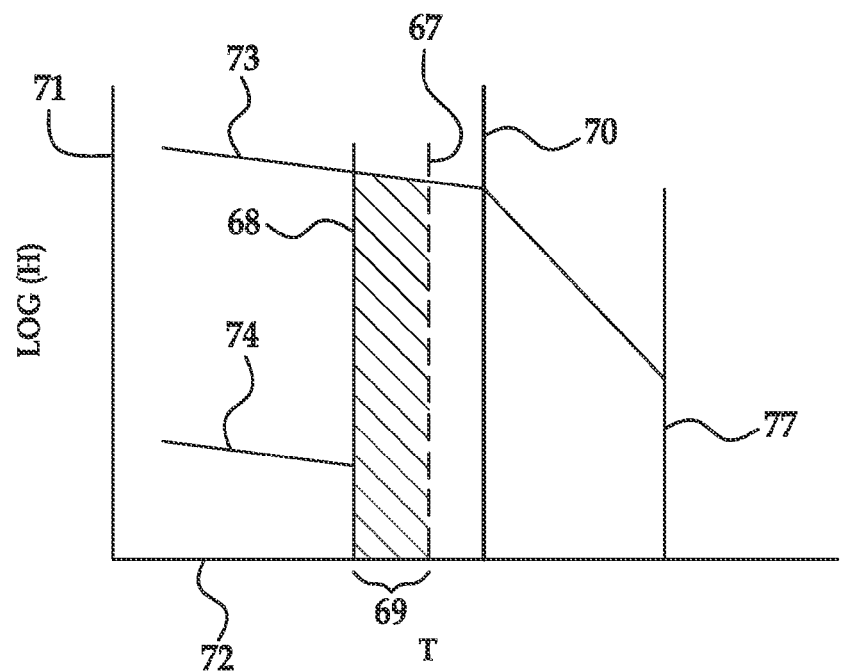
FIG. 2B is a graph depicting an example of temperature and hardness relationships for a core, hub and rim gear for friction plunge welding according to the present disclosure.

FIG. 2B is a graph depicting an example of temperature and hardness relationships for a core 12, hub 10 and rim gear 14 for friction plunge welding according to the present disclosure. A common log of hardness (H) is depicted on the ordinate axis 71 and absolute temperature is depicted on the abscissa 72. The rim gear/hub trace 73 depicts a relationship between temperature and hardness of the rim gear 14 and hub 10. The rim gear 14 and hub 10 are presumed to be formed from similar materials. In an example, the rim gear 14 and hub 10 may be formed from steel.

The rim gear/hub trace 73 demonstrates the transition temperature $T_t$ and the hot hardness temperature 70 as described above. The core trace 74 shows that the core 12 is made from a material that has a hardness significantly below the hardness of the material of the rim gear 14 and hub 10. In an example, the core 12 may be formed from an aluminum alloy. In the example depicted in FIG. 2B, the core forging temperature 69 is between a minimum core forging temperature 68 and the core melting temperature 67. It is to be understood that the core melting temperature 67 is a theoretical boundary for the core forging temperature 69, but is not reached. The core melting temperature 67 is indicated by a dashed line by convention indicating that the core forging temperature 69 is less than the core melting temperature 67. Therefore, the core 12 does not melt in examples of the present disclosure. In the example depicted in FIG. 2B, the hot hardness temperature 70 is greater than the core melting temperature 67. If the hot hardness temperature 70 were less than the core melting temperature 67, the upper temperature limit for the core forging temperature 69 would be the hot hardness temperature 70. In the example shown in FIG. 2B, the minimum rim gear/core forging temperature 77 is much higher than the core forging temperature 69. Therefore, since the FPLW of the present disclosure does not exceed the core forging temperature 69, the rim gear 14 and hub 10 will remain solid and will not flow.

FIG. 3A depicts a semi-schematic cross-sectional view of an example of a rotating rim gear 14 and hub 10 aligned with a core 12 prior to FPLW according to the present disclosure. FIG. 3B depicts a semi-schematic cross-sectional view of the example depicted in FIG. 3A after being formed into a gear 20 by FPLW according to the present disclosure. Examples of the method disclosed herein include driving a steel component (e.g., the hub 10 and the rim gear 14) into an interference fit bore or outside diameter of an aluminum component (e.g., the core 12). The amount of interference may range from about 0.1 mm (0.004 inch) to about 2.5 mm (0.100 inch) or more. In an example, for a lightweight steel-aluminum gear 20 with a pitch diameter of about 203 mm (8 inches), the interference fit can be about 2.25 mm (0.090 inch).

As depicted in FIG. 3A, the hub 10 has a cylindrical wall 21 having a central axis 22. The cylindrical wall 21 defines a bore 23. In an example, the bore 23 may be smooth as depicted in FIG. 3A. In the example depicted in FIG. 1A, however, the bore 23' has inward projecting teeth 24 to engage complementary structures on a shaft (not shown). The hub 10 has a chamfered hub end 25 to penetrate the core 12. The hub 10 has a hub chamfer 29 defined at the hub outer diameter 28 on the chamfered hub end 25. A hub flange end 26 is opposite the chamfered hub end 25. The hub flange end 26 has an annular hub flange 27 defined thereon. The annular hub flange 27 extends radially outward from the hub outer diameter 28. An outer annular groove 30 is defined in a first faying surface 59 of the hub 10. As used herein, a "faying surface" means a surface to be joined to another surface by welding. The outer annular groove 30 is defined in the cylindrical wall 21 between the hub chamfer 29 and the annular hub flange 27. In the example depicted in FIG. 3A, the outer annular groove 30 is V-shaped with a fillet 31 between flat sides 32.

Still referring to FIG. 3A, the core 12 has a cylindrical barrel 33 defined about the central axis 22. The cylindrical barrel 33 defines a cylindrical barrel wall 34. The core 12 has a chamfered core end 35 to penetrate the rim gear 14. The core 12 has a core chamfer 39 defined at the core outer diameter 38 on the chamfered core end 35. The core 12 has a core inner diameter 40 smaller than the core outer diameter 38. A core flange end 36 is opposite the chamfered core end 35. The core flange end 36 has an annular core flange 37 defined thereon. The annular core flange 37 extends radially outward from the core outer diameter 38.

As depicted in FIG. 3A, the rim gear 14 has an annular wall 41 about the central axis 22. The annular wall 41 defines a cylindrical surface 43 having a rim gear inner diameter 48. In the example depicted in FIG. 1C, the annular wall 41 has outward projecting gear teeth 44. The rim gear 14 has a first rim gear end 45 to receive the core 12. A second rim gear end 46 is opposite the first rim gear end 45. An inner annular groove 50 is defined in a second faying surface 60 of the rim gear 14. The inner annular groove 50 is defined in the annular wall 41 between the first rim gear end 45 and the second rim gear end 46. In the example depicted in FIG. 3A, the inner annular groove 50 is V-shaped with a fillet 31' between flat sides 32'.

Prior to driving the hub 10 into the core 12, the core 12 has a core inner diameter 40 smaller than the hub outer diameter 28. Prior to driving the rim gear 14 over the core 12, the core 12 has a core outer diameter 38 larger than a rim gear inner diameter 48 of the rim gear 14. In an example, the core inner diameter 40 may interfere with the hub outer diameter 28 with an amount of interference ranging from about 0.1 mm (0.004 inch) to about 2.5 mm (0.100 inch). Similarly, in an example, the core outer diameter 38 may interfere with the rim gear inner diameter 48 with an amount of interference ranging from about 0.1 mm (0.004 inch) to about 2.5 mm (0.100 inch).

In FIG. 3A, hub rotation arrow 51 indicates relative rotation between the hub 10 and the core 12. In the example depicted in FIG. 3A, the core 12 is held stationary. Rim gear rotation arrow 52 indicates relative rotation between the rim gear 14 and the core 12. It is to be understood that the rotation may be clockwise or counterclockwise. Further, the hub 10 may rotate in an opposite direction to the rotation of the rim gear 14. Hub plunge direction arrow 53 indicates that the hub 10 is forced into the core 12. Rim gear plunge direction arrow 54 indicates that the rim gear 14 is forced over the core 12.

In an example, the hub 10 is rotated relative to the core 12 in contact with the core 12 to produce friction heat to raise the hub interface temperature of the core 12 to the core forging temperature 69. As used herein, the "core forging temperature" means a temperature between the minimum core forging temperature 68 of the core 12 and a lower of the hot hardness temperature 70 of the rim gear 14 and the hub 10 or a core melting temperature 67 of the core 12. In an example with the hub 10 and rim gear 14 both made from AISI 4150 and the core 12 made from aluminum alloy 6061, the core forging temperature 69 may be from about 450° C. to about 600° C. based on the temperature properties of the materials provided above. The time to raise the interface temperature of the core 12 to the core forging temperature 69 may range from about two seconds to about 30 seconds, depending on the mass of the parts. The time to raise the interface temperature of the core 12 to the core forging temperature 69 may also depend on the force applied to the parts and the speed of rotation. The temperature of the hub 10 and the rim gear 14 rise correspondingly to the interface temperature of the core 12. However, since the hub 10 and rim gear 14 have a hot hardness temperature 70 above the core forging temperature 69, the rim gear 14 and the hub 10 do not reach the hot hardness temperature 70 according to the method of the present disclosure.

In the example of the present disclosure depicted in FIGS. 3A and 3B, the hub 10 is driven into the core 12 until the annular hub flange 27 contacts the core 12. A first solid state weld 55 and a first mechanical lock 56 are formed between the hub 10 and the core 12. The first solid state weld 55 also joins the annular hub flange 27 to the chamfered core end 35 of the core 12. The rim gear 14 is driven over the core 12 until the annular core flange 37 contacts the rim gear 14. A second solid state weld 57 and second mechanical lock 58 are formed between the core 12 and the rim gear 14. The second solid state weld 57 also joins the annular core flange 37 to the rim gear 14.

The first solid state weld 55 and the second solid state weld 57 each have portions (i.e., at the annular hub flange 27 and at the annular core flange 37) that are perpendicular to the central axis 22. The perpendicular solid state weld portions complement the portions of the first solid state weld 55 and the second solid state weld 57 that develop at the faying surfaces 59, 60 parallel to the central axis 22. The mechanical strength of the FPLW joints between the steel driver components (e.g., the hub 10 and the rim gear 14) and the aluminum receiver component (e.g., the core 12) is determined by a combination of three factors: (1) the strength of the solid state weld bond parallel to the central axis 22; (2) the strength of the solid state weld bond at the flange 27, 37 and perpendicular to the central axis 22; and (3) the strength of the mechanical interlock formed with aluminum upset metal filling the inner annular groove 50 and the outer annular groove 30.

In the example depicted in FIGS. 3A and 3B, the core 12 is held stationary, and the free diameter (diameter farthest away from the rim gear 14 or the hub 10) is constrained from growth by a collet (not shown) or another work piece. Constraining the free diameter of the softer, lower hot hardness material guides the movement of the upset material along a path adjacent to the faying surfaces 59, 60. This guidance of the upset aluminum metal causes the inner annular groove 50 and the outer annular groove 30 to be filled by upset material. The inner annular groove 50 and the outer annular groove 30 are to be positioned along the path of movement of the upset aluminum metal. In an example, the driving of the rim gear 14 over the core 12, and the driving of the hub 10 into the core 12 may be executed simultaneously. The simultaneous plunging constrains both the core outer diameter 38 and the core inner diameter 40 so the upset aluminum is guided into the inner annular groove 50 and the outer annular groove 30.

Frictional heating requires from two to 30 seconds, depending on mass of the work pieces. The rim gear interface and the hub interface of the core 12 are raised to the core forging temperature 69, at which the core material flows easily and is readily pushed out of the way by the hub 10 and the rim gear 14. Following the brief frictional heating period, the rotating hub 10 and rim gear 14 are driven into the core 12. Force for driving the hub 10 and rim gear 14 into the core 12 is obtained from a hydraulic cylinder (not shown). The steel driver (e.g., the hub 10 or the rim gear 14) initially encounters the interfering aluminum material, penetrates the aluminum and creates pressure in the interfering aluminum that causes the aluminum to extrude along the faying surfaces 59, 60. A portion of the upset aluminum may move ahead of the steel driver, and another portion may back extrude opposite to the respective hub plunge direction arrow 53 or the rim gear plunge direction arrow. An amount of the upset aluminum may emerge from between the faying surfaces 59, 60 and out beyond the ends of the faying surfaces 59, 60 as a "ram's horn" 47. However, when the advancing or back extruding upset material encounters a groove (e.g., the inner annular groove 50 or the outer annular groove 30) defined in the steel driver component, the groove is filled with the upset aluminum, creating a mechanical lock. The amount of the upset aluminum that emerges beyond the ends of the faying surfaces 59, 60 depends on an interference volume and on a portion of the interference volume that gets diverted into the inner annular groove 50 or the outer annular groove 30. The ram's horns 47 may be removed, for example by grinding or machining; however, it may not be necessary to remove the ram's horns 47.

Figures 4A, 4B:
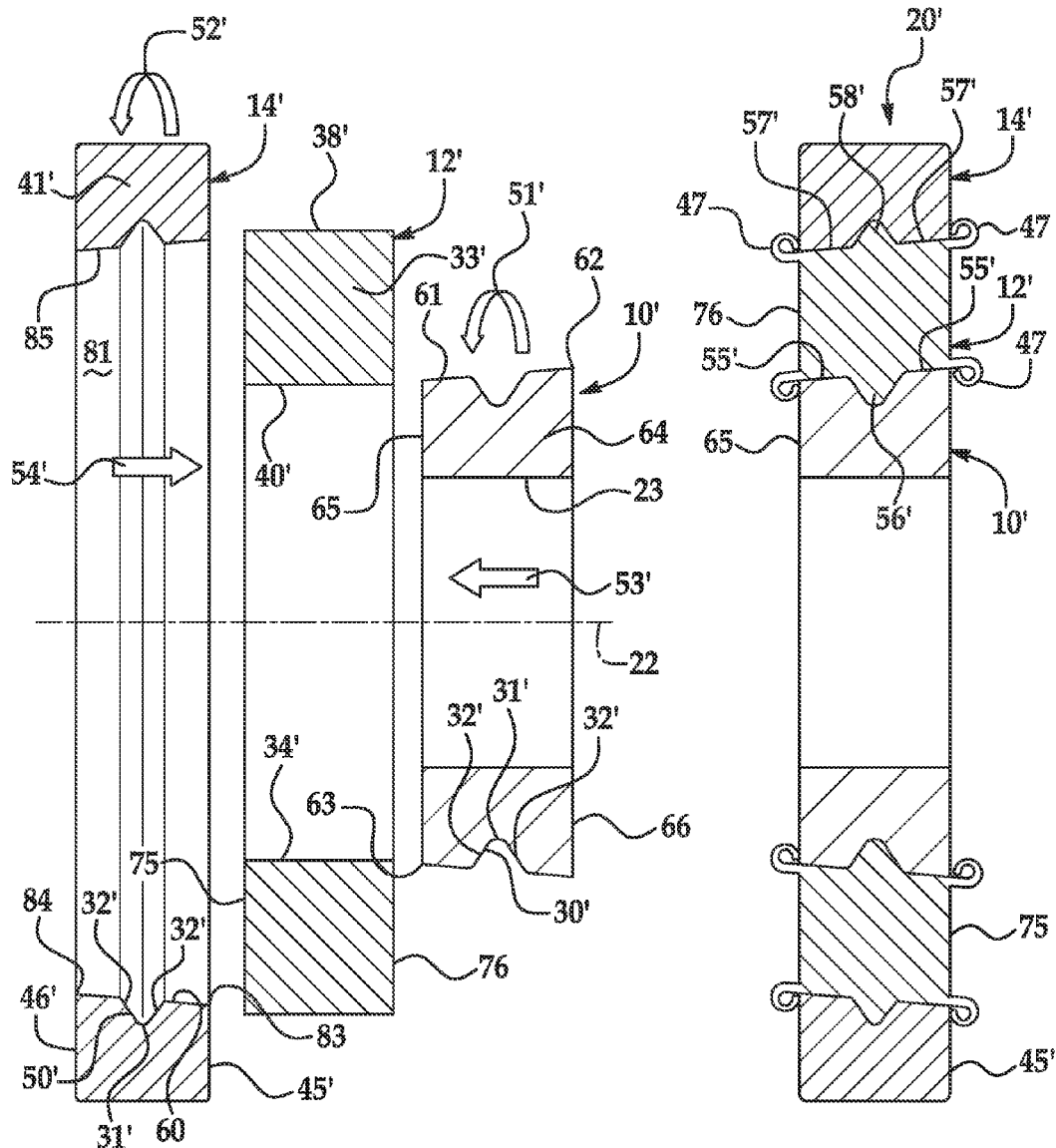
FIG. 4A depicts a semi-schematic cross-sectional view of another example of a rotating rim gear and hub aligned with a core prior to friction plunge welding according to the present disclosure.
FIG. 4B depicts a semi-schematic cross-sectional view of the example depicted in FIG. 4A after being formed into a gear by friction plunge welding according to the present disclosure.

FIG. 4A depicts a semi-schematic cross-sectional view of another example of a rotating rim gear 14' and hub 10' aligned with a core 12' prior to FPLW according to the present disclosure. FIG. 4B depicts a semi-schematic cross-sectional view of the example depicted in FIG. 4A after being formed into a gear 20' by FPLW according to the present disclosure.

As depicted in FIG. 4A, the hub 10' has a barrel wall 64 having a central axis 22. The barrel wall 64 defines a bore 23. In an example, the bore 23 may be smooth or may have a contour that is complementary to a shaft (not shown). The hub 10' has a frustoconical outer surface 61 with a smaller hub end 65 to penetrate the core 12'. A larger hub end 66 is opposite the smaller hub end 65. In examples of the present disclosure, a largest hub diameter 62 at the larger hub end 66 may be larger than a smallest hub diameter 63 at the smaller hub end 65 by about 0.1 mm (0.004 inch) to about 2.5 mm (0.100 inch). Unlike the example depicted in FIG. 3A, the example depicted in FIG. 4A does not have a flange defined on the hub. An outer annular groove 30' is defined in a first faying surface 59' of the hub 10'. The outer annular groove 30' is defined in the frustoconical outer surface 61 between the smaller hub end 65 and the larger hub end 66. In the example depicted in FIG. 4A, the outer annular groove 30' is V-shaped with a fillet 31' between flat sides 32'.

Still referring to FIG. 4A, the core 12' has a cylindrical barrel 33' defined about the central axis 22. The cylindrical barrel 33' defines a cylindrical barrel wall 34'. The core 12' has a first core end 75 to penetrate the rim gear 14'. The core 12' has a core inner diameter 40' smaller than a core outer diameter 38'. A second core end 76 is opposite the first core end 75.

As depicted in FIG. 4A, the rim gear 14' has an annular wall 41' about the central axis 22. The annular wall 41' defines an interior surface 85 defining a frustoconical space 81. Similar to the example depicted in FIG. 1C, the annular wall 41' may have outward projecting gear teeth 44. The rim gear 14' has a first rim gear end 45' to receive the core 12'. A largest rim gear inner diameter 83 is at the first rim gear end 45'. A second rim gear end 46' is opposite the first rim gear end 45'. A smallest rim gear inner diameter 84 is at the second rim gear end 46'. An inner annular groove 50' is defined in a second faying surface 60' of the rim gear 14'. The inner annular groove 50' is defined in the annular wall 41' between the first rim gear end 45' and the second rim gear end 46'. In the example depicted in FIG. 4A, the inner annular groove 50' is V-shaped with a fillet 31' between flat sides 32'.

Prior to driving the hub 10' into the core 12', the core 12' has a core inner diameter 40' smaller than the smallest hub diameter 63. In an example, the core inner diameter 40' may interfere with the smallest hub diameter 63 with an amount of interference ranging from about 0.1 mm (0.004 inch) to about 2.5 mm (0.100 inch). Prior to driving the rim gear 14' over the core 12', the core 12' has a core outer diameter 38' larger than the largest rim gear inner diameter 83 at the first rim gear end 45'. Although the frustoconical space 81 is largest at the first rim gear end 45', there is an interference to generate friction when the rim gear 14' is rotated relative to the core 12'. In an example, the core outer diameter 38' may interfere with the largest rim gear inner diameter 83 with an amount of interference ranging from about 0.1 mm (0.004 inch) to about 2.5 mm (0.100 inch).

In FIG. 4A, hub rotation arrow 51' indicates relative rotation between the hub 10' and the core 12'. In the example depicted in FIG. 4A, the core 12' is held stationary. Rim gear rotation arrow 52' indicates relative rotation between the rim gear 14' and the core 12'. It is to be understood that the rotation may be clockwise or counterclockwise. Further, the hub 10' may rotate in an opposite direction to the rotation of the rim gear 14'. Hub plunge direction arrow 53' indicates that the hub 10' is forced into the core 12'. Rim gear plunge direction arrow 54' indicates that the rim gear 14' is forced over the core 12'. Rim gear plunge direction arrow 54' is opposite hub plunge direction arrow 53'. The hub 10' may be driven into the core 12' before the rim gear 14' is driven over a sub assembly of the hub 10' and the core 12'.

In the example of the present disclosure depicted in FIGS. 4A and 4B, the hub 10' is driven into the core 12' until the hub 10' is in a predetermined position relative to the core 12'. As depicted in FIG. 4B, the predetermined position of the hub 10' relative to the core 12' is characterized by the smaller hub end 65 and the second core end 76 lying in the same plane. A first solid state weld 55' and a first mechanical lock 56' are formed between the hub 10' and the core 12'. The rim gear 14' is driven over the core 12' until the rim gear 14' is in a predetermined location relative to the core 12'. As depicted in FIG. 4B, the predetermined location of the rim gear 14' relative to the core 12' is characterized by the first rim gear end 45' and first core end 75 lying in the same plane. A second solid state weld 57' and second mechanical lock 58' are formed between the core 12' and the rim gear 14'.

In the example depicted in FIGS. 4A and 4B, the core 12' is held stationary, and the free diameter (diameter farthest away from the rim gear 14' or the hub 10') is constrained from growth by a collet (not shown) or the hub 10'. Constraining the free diameter of the softer, lower hot hardness material guides the movement of the upset material along the intended path. This guidance of the upset aluminum metal causes the inner annular groove 50' and the outer annular groove 30' to be filled by upset material. The inner annular groove 50' and the outer annular groove 30' are to be positioned along the path of movement of the upset aluminum metal. Ram's horns 47 may form similarly to the ram's horns 47 disclosed above in relation to FIG. 3B.

Figure 5A:
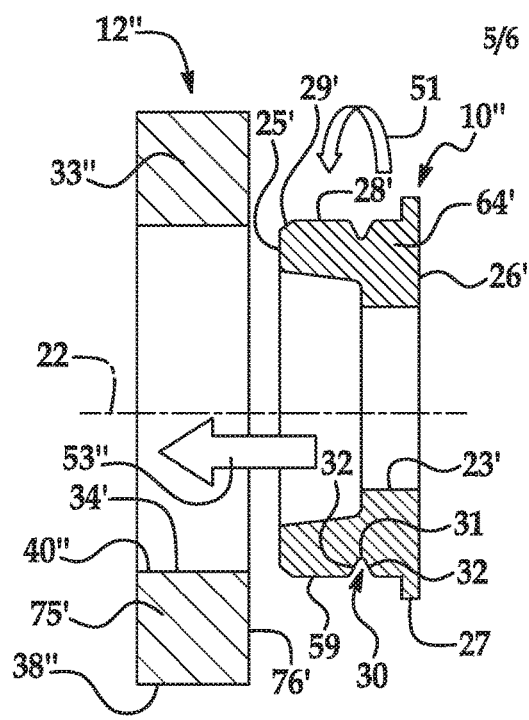
FIG. 5A depicts a semi-schematic cross-sectional view of an example of a rotating hub aligned with a core prior to friction plunge welding according to the present disclosure.
Figure 5B:
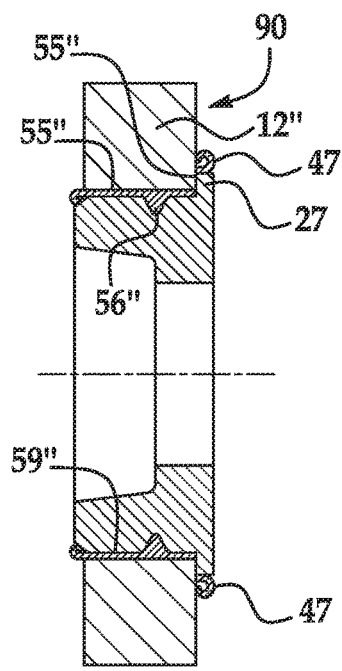
FIG. 5B depicts a semi-schematic cross-sectional view of the example depicted in FIG. 5A after being formed into a hub core subassembly by friction plunge welding according to the present disclosure.
Figure 5C:
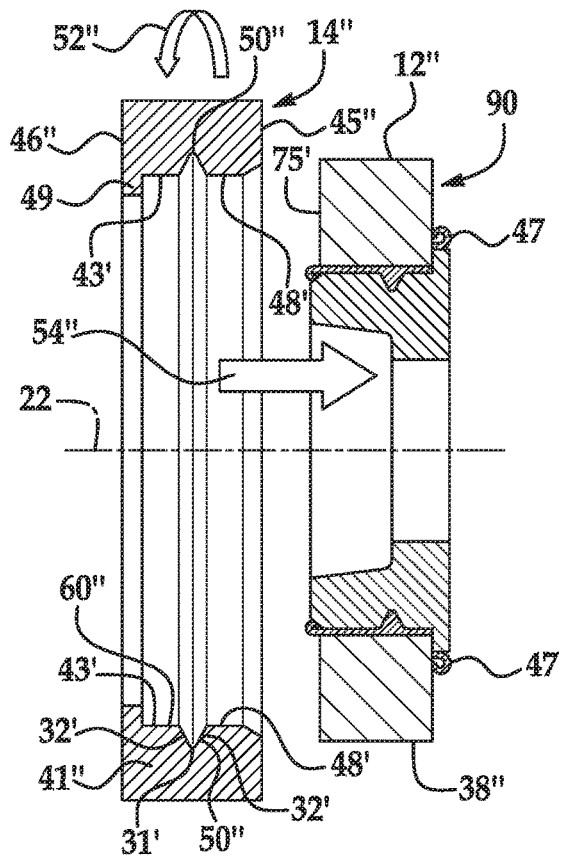
FIG. 5C depicts a semi-schematic cross-sectional view of an example of a rotating rim gear aligned with the hub core subassembly from FIG. 5B prior to friction plunge welding according to the present disclosure.
Figure 5D:
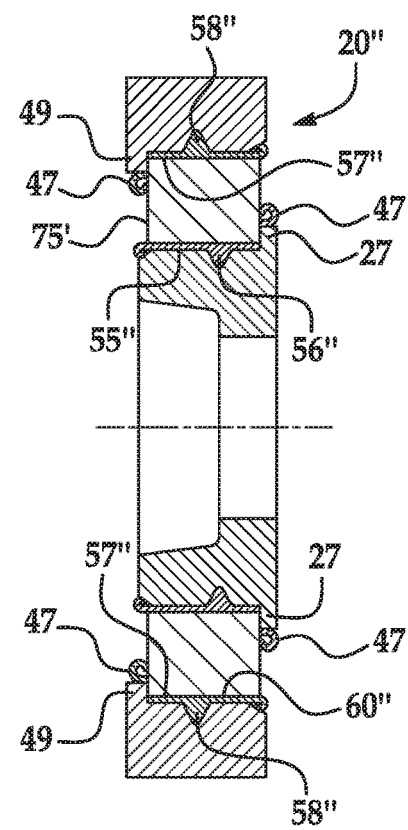
FIG. 5D depicts a semi-schematic cross-sectional view of the example depicted in FIG. 5C after being formed into a gear by friction plunge welding according to the present disclosure.

FIG. 5A depicts a semi-schematic cross-sectional view of an example of a rotating hub 10" aligned with a core 12" prior to FPLW according to the present disclosure. FIG. 5B depicts a semi-schematic cross-sectional view of the example depicted in FIG. 5A after being formed into a hub core subassembly 90 by FPLW according to the present disclosure. FIG. 5C depicts a semi-schematic cross-sectional view of an example of a rotating rim gear 14" aligned with the hub core subassembly 90 from FIG. 5B prior to FPLW according to the present disclosure. FIG. 5D depicts a semi-schematic cross-sectional view of the example depicted in FIG. 5C after being formed into a gear 20" by FPLW according to the present disclosure.

As depicted in FIG. 5A, the hub 10" has a barrel wall 64' having a central axis 22. The barrel wall 64' defines a bore 23'. In an example, the bore 23' may be smooth or may have a contour that is complementary to a shaft, journal, or bearing assembly (not shown). The hub 10" has a chamfered hub end 25' to penetrate the core 12". The hub 10" has a hub chamfer 29' defined at the hub outer diameter 28' on the chamfered hub end 25'. A hub flange end 26' is opposite the chamfered hub end 25'. The hub flange end 26' has an annular hub flange 27 defined thereon. The annular hub flange 27 extends radially outward from the hub outer diameter 28'. An outer annular groove 30 is defined in a first faying surface 59 of the hub 10". The outer annular groove 30 is defined in the barrel wall 64' between the hub chamfer 29' and the annular hub flange 27. In the example depicted in FIG. 5A, the outer annular groove 30 is V-shaped with a fillet 31 between flat sides 32.

Still referring to FIG. 5A, the core 12" has a cylindrical barrel 33" defined about the central axis 22. The cylindrical barrel 33" defines a cylindrical barrel wall 34". The core 12" has a first core end 75' to penetrate the rim gear 14"(see FIG. 5C and FIG. 5D). The core 12" has a core inner diameter 40" smaller than a core outer diameter 38". A second core end 76' is opposite the first core end 75'.

Prior to driving the hub 10" into the core 12", the core 12" has a core inner diameter 40" smaller than the hub outer diameter 28'. In an example, the core inner diameter 40" may interfere with the hub outer diameter 28" with an amount of interference ranging from about 0.1 mm (0.004 inch) to about 2.5 mm (0.100 inch).

In FIG. 5A, hub rotation arrow 51 indicates relative rotation between the hub 10" and the core 12". In the example depicted in FIG. 5A, the core 12" is held stationary. It is to be understood that the rotation may be clockwise or counterclockwise. Hub plunge direction arrow 53" indicates that the hub 10" is forced into the core 12".

In the example depicted in FIGS. 5A and 5B, the core 12" is held stationary and the free diameter (diameter farthest away from the hub 10') is constrained from growth by a collet (not shown). Constraining the free diameter of the softer, lower hot hardness material guides the movement of the upset material along the intended path. This guidance of the upset aluminum metal causes the outer annular groove 30 to be filled by upset material. The outer annular groove 30 is to be positioned along the path of movement of the upset aluminum metal. Ram's horns 47 may form similarly to the ram's horns 47 disclosed above in relation to FIG. 3B.

As depicted in FIG. 5C, the rim gear 14" has an annular wall 41" about the central axis 22. The annular wall 41" defines a cylindrical surface 43' having a rim gear inner diameter 48'. Similar to the example depicted in FIG. 1C, the annular wall 41" may have outward projecting gear teeth 44. The rim gear 14" has a first rim gear end 45" to receive the core 12". A second rim gear end 46" is opposite the first rim gear end 45". The second rim gear end 46" has an annular rim gear flange 49 defined thereon. The annular rim gear flange 49 extends radially inward from the rim gear inner diameter 48'. An inner annular groove 50" is defined in a second faying surface 60" of the rim gear 14". The inner annular groove 50" is defined in the annular wall 41" between the first rim gear end 45" and the second rim gear end 46". In the example depicted in FIG. 5C, the inner annular groove 50" is V-shaped with a fillet 31' between flat sides 32'.

Prior to driving the rim gear 14" over the core 12", the core 12" has a core outer diameter 38" larger than a rim gear inner diameter 48' of the rim gear 14". In an example, the core outer diameter 38" may interfere with the rim gear inner diameter 48' with an amount of interference ranging from about 0.1 mm (0.004 inch) to about 2.5 mm (0.100 inch).

Rim gear rotation arrow 52" indicates relative rotation between the rim gear 14" and the core 12". The rim gear 14" may rotate in an opposite direction to the rotation of the hub 10" or in the same direction as the rotation of the hub 10". Rim gear plunge direction arrow 54" indicates that the rim gear 14" is forced over the core 12".

In the example of the present disclosure depicted in FIGS. 5A-5B, the hub 10" is driven into the core 12" until the annular hub flange 27 contacts the core 12". A first solid state weld 55" and a first mechanical lock 56" are formed between the hub 10" and the core 12". The first solid state weld 55" also joins the annular hub flange 27 to the chamfered core end 35' of the core 12".

As depicted in FIGS. 5C-5D, the rim gear 14" is driven over the core 12" until the annular rim gear flange 49 contacts the core 12". A second solid state weld 57" and second mechanical lock 58" are formed between the core 12" and the rim gear 14". The second solid state weld 57" also joins the annular rim gear flange 49 to the core 12".

In the example depicted in FIGS. 5C and 5D, the hub core subassembly 90 is held stationary and the free diameter of the core (diameter farthest away from the rim gear 14") is constrained from growth by the hub 10". Constraining the free diameter of the softer, lower hot hardness material guides the movement of the upset material along the intended path. This guidance of the upset aluminum metal causes the inner annular groove 50" to be filled by upset material. The inner annular groove 50" is to be positioned along the path of movement of the upset aluminum metal. Ram's horns 47 may form similarly to the ram's horns 47 disclosed above in relation to FIG. 3B.

The first solid state weld 55" and the second solid state weld 57" each have portions (e.g., at the annular hub flange 27 and at the annular rim gear flange 49) that are perpendicular to the central axis 22. The perpendicular solid state weld portions complement the portions of the first solid state weld 55" and the second solid state weld 57" that develop at the faying surfaces 59", 60" parallel to the central axis 22. The mechanical strength of the FPLW joints between the steel driver components (e.g., the hub 10" and the rim gear 14") and the aluminum receiver component (e.g., the core 12") is determined by a combination of three factors: (1) the strength of the solid state weld bond parallel to the central axis 22; (2) the strength of the solid state weld bond at the annular hub flange 27, the annular rim gear flange 49, and perpendicular to the central axis 22; and (3) the strength of the mechanical interlock formed with aluminum upset metal filling the inner annular groove 50" and the outer annular groove 30".

FIG. 6 is a flowchart depicting an example of the method of the present disclosure. At reference numeral 110, FIG. 6 depicts a step of providing a rim gear, a hub and a core wherein the core is annular and has a core forging temperature below a hot hardness temperature of the rim gear and the hub. Reference numeral 120 depicts the step of rotating, about an axis, the rim gear and the hub relative to the core, the rim gear and the hub in contact with the core to generate friction heat to raise an interface temperature of the core to the core forging temperature. Reference numeral 130 depicts the step of driving the hub into the core to upset a first portion of the core into an outer annular groove defined in a first faying surface of the hub. Reference numeral 140 depicts the step of driving the rim gear over the core to upset a second portion of the core into an inner annular groove defined in a second faying surface of the rim gear.

FIG. 7 is a flowchart depicting another example of the method of the present disclosure. Reference numeral 210 depicts the step of providing a rim gear, a hub and a core wherein the core is annular and has a core forging temperature below a hot hardness temperature of the rim gear and the hub. Reference numeral 220 depicts the step of rotating, about an axis, the hub relative to the core, the hub in contact with the core to generate friction heat to raise a hub interface temperature of the core to the core forging temperature. Reference numeral 230 depicts the step of driving the hub into the core to upset a first portion of the core into an outer annular groove defined in a first faying surface of the hub. Reference numeral 240 depicts the step of rotating, about the axis, the rim gear relative to the hub core subassembly, the rim gear in contact with the core to generate friction heat to raise a rim gear interface temperature of the core to the core forging temperature. Reference numeral 250 depicts the step of driving the rim gear over the core to upset a second portion of the core into an inner annular groove defined in a second faying surface of the rim gear.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Further, it is to be understood that the ranges provided herein include the stated range and any value or sub-range within the stated range. For example, a depth ranging from about 0.1 mm to about 2.5 mm should be interpreted to include not only the explicitly recited limits of 0.1 mm to 2.5 mm, but also to include individual amounts, such as 0.12 mm, 1.5 mm, etc., and sub-ranges, such as from about 0.2 mm to about 0.9 mm, etc. Furthermore, when "about" is utilized to describe a value, this is meant to encompass minor variations (±10% from the stated value (e.g., about 2.5 mm is 2.25 mm to 2.75 mm)).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for manufacturing a gear, comprising:
providing a rim gear, a hub and a core wherein the core is annular and has a core forging temperature below a hot hardness temperature of the rim gear and the hub;
rotating, about an axis, the rim gear and the hub relative to the core, the rim gear and the hub in contact with the core to generate friction heat to raise an interface temperature of the core to the core forging temperature without melting the core;
driving the hub into the core to upset a first portion of the core into an outer annular groove defined in a first faying surface of the hub, wherein, prior to driving the hub into the core, the core has a core inner diameter smaller than a hub outer diameter; and
driving the rim gear over the core to upset a second portion of the core into an inner annular groove defined in a second faying surface of the rim gear, wherein, prior to driving the rim gear over the core, the core has a core outer diameter larger than a rim gear inner diameter.

2. The method as defined in claim 1 wherein the core forging temperature is between a minimum core forging temperature and a lower of the hot hardness temperature of the rim gear and the hub or a core melting temperature of the core.

3. The method as defined in claim 2 wherein:
a first solid state weld and a first mechanical lock are formed between the hub and the core; and
a second solid state weld and second mechanical lock are formed between the hub and the rim gear.

4. The method as defined in claim 3 wherein:
the rim gear and the hub are formed from a steel; and
the core is formed from an aluminum alloy.

5. The method as defined in claim 4 wherein:
the hot hardness temperature of the rim gear and the hub is at least 800 degrees Celsius;
the core melting temperature of the core is about 600 degrees Celsius; and
the core forging temperature is between about 450 degrees Celsius and about 600 degrees Celsius.

6. The method as defined in claim 3 wherein:
the hub has a chamfered hub end to penetrate the core, and a hub flange end opposite the chamfered hub end, the hub flange end having an annular hub flange defined thereon;
the driving the hub into the core continues until the annular hub flange contacts the core;
the core has a chamfered core end to penetrate the rim gear, and a core flange end opposite the chamfered core end, the core flange end having an annular core flange defined thereon; and
the driving the rim gear over the core continues until the annular core flange contacts the rim gear.

7. The method as defined in claim 6 wherein:
the first solid state weld joins the hub flange to the chamfered core end; and
the second solid state weld joins the annular core flange to the rim gear.

8. The method as defined in claim 3 wherein the driving the rim gear over the core and the driving the hub into the core are executed simultaneously.

9. The method for manufacturing a gear as defined in claim 1 wherein:
the rotating of the hub in contact with the core is to generate friction heat to raise a hub interface temperature of the core to the core forging temperature;
the driving the hub into the core is to form a hub core subassembly;
the rotating, about the axis, of the rim gear relative to the core is further relative to the hub core subassembly;
the rotating, about the axis, of the rim gear relative to the core and the hub core subassembly is subsequent to the formation of the hub core subassembly; and
the rotating of the rim gear in contact with the core is to generate friction heat to raise a rim gear interface temperature of the core to the core forging temperature.

10. The method as defined in claim 9 wherein the core forging temperature is between a minimum core forging temperature and a lower of the hot hardness temperature of the rim gear and the hub or a core melting temperature of the core.

11. The method as defined in claim 10 wherein:
a first solid state weld and a first mechanical lock are formed between the hub and the core; and
a second solid state weld and second mechanical lock are formed between the hub and the rim gear.

12. The method as defined in claim 11 wherein:
the hub has a chamfered hub end to penetrate the core, and a hub flange end opposite the chamfered hub end, the hub flange end having an annular hub flange defined thereon;
the driving the hub into the core continues until the annular hub flange contacts the core;
the rim gear has a first rim gear end to be penetrated by a first core end of the core, and a second rim gear end opposite the first rim gear end, the second rim gear end having an annular rim gear flange defined thereon;
the core has a second core end opposite the first core end; and
the driving the rim gear over the core continues until the annular rim gear flange contacts the core.

13. The method as defined in claim 12 wherein:
the first solid state weld joins the hub flange to the first core end; and
the second solid state weld joins the annular rim gear flange to the core at the second core end.

14. The method as defined in claim 10 wherein:
the rim gear and the hub are formed from a steel; and
the core is formed from an aluminum alloy.

15. The method as defined in claim 14 wherein:
the hot hardness temperature of the rim gear and the hub is at least 800 degrees Celsius;
the core melting temperature of the core is about 600 degrees Celsius; and
the core forging temperature is between about 450 degrees Celsius and about 600 degrees Celsius.

* * * * *